United States Patent [19]

Ziolo

[11] Patent Number: 5,362,417
[45] Date of Patent: Nov. 8, 1994

[54] METHOD OF PREPARING A STABLE COLLOID OF SUBMICRON PARTICLES

[75] Inventor: Ronald E. Ziolo, Webster, N.Y.

[73] Assignee: Xerox Corporation, Stamford, Conn.

[21] Appl. No.: 910,803

[22] Filed: Jul. 9, 1992

[51] Int. Cl.$^5$ .......................... B01F 3/12; B01F 3/20; B01J 13/00

[52] U.S. Cl. ........................................ 252/314; 8/514; 8/647; 252/184; 252/313.1; 252/363.5; 423/DIG. 14; 423/DIG. 15

[58] Field of Search ...................... 252/313.1, 314, 184, 252/363.5, 501.1; 423/508, 509, DIG. 14, DIG. 15; 210/660, 665; 8/514, 647

[56] References Cited

U.S. PATENT DOCUMENTS

| | | | |
|---|---|---|---|
| 2,616,791 | 11/1952 | Roseman et al. | 423/509 |
| 2,870,000 | 1/1959 | Ryznar | 423/DIG. 14 |
| 3,152,046 | 10/1964 | Kapral | 252/314 X |
| 3,654,161 | 4/1972 | Geus | 252/62.56 |
| 3,697,265 | 10/1972 | Teuscher et al. | 252/501.1 X |
| 3,867,299 | 2/1975 | Rohatgi | 252/62.54 |
| 3,977,984 | 8/1976 | Roberts | 252/62.56 |
| 4,022,701 | 5/1977 | Sawa et al. | 252/62.54 |
| 4,122,030 | 10/1978 | Smith et al. | 252/318.1 |
| 4,381,338 | 4/1983 | Suzuki | 210/665 X |
| 4,474,866 | 10/1984 | Ziolo | 430/106.6 |
| 4,622,281 | 11/1986 | Imai et al. | 430/107 |
| 4,645,619 | 2/1987 | Badesha et al. | 252/314 |
| 4,758,275 | 7/1988 | Yubakami et al. | 106/20 R |
| 4,760,009 | 7/1988 | Larson | 430/137 |
| 4,855,079 | 8/1989 | Wyman | 252/62.52 |
| 4,873,102 | 10/1989 | Chang et al. | 427/130 |
| 5,047,307 | 9/1991 | Landa et al. | 430/137 |
| 5,114,477 | 5/1992 | Mort et al. | 106/20 R |

FOREIGN PATENT DOCUMENTS

| | | | |
|---|---|---|---|
| 0055065 | 6/1982 | European Pat. Off. | |
| 3826281 | 2/1990 | Germany | 423/509 |
| 51-5692 | 6/1976 | Japan | 423/508 |
| 0102577 | 6/1983 | Japan | 252/501.1 |
| 0757573 | 8/1980 | U.S.S.R. | |

OTHER PUBLICATIONS

English language abstract of Soviet 0 757 573.

*Primary Examiner*—Richard D. Lovering
*Attorney, Agent, or Firm*—Finnegan, Henderson, Farabow, Garrett & Dunner

[57] ABSTRACT

The invention provides submicron particles. The invention further provides submicron particles which are dispersed in an aqueous colloid. The invention further provides a method of forming the stable dispersion which includes providing an ion exchange resin, loading the ion exchange resin with an ion, treating the loaded resin to form nanoscale particles. The invention further provides fluidizing the resin and particles to form an aqueous stable colloid.

16 Claims, 3 Drawing Sheets

METHOD OF PREPARING A STABLE COLLOID OF SUBMICRON PARTICLES

BACKGROUND OF THE INVENTION

1. Field of the Invention

The present invention relates to the formation of a stable colloidal dispersion of fine particles. More particularly, the invention relates to the formation of nanocomposites.

More specifically, the invention relates to the formation of continuous films of submicron particles.

2. Description of the Prior Art

Prior art formation of submicron or nanometer structures have predominantly included the formation of large particles which are subsequently ground or milled until particles of the desired size are achieved. The grinding and milling times associated with the formation of such particles ranged from 120 to 2900 hours.

A method of forming dry magnetic submicron particles by precipitation of a magnetic oxide in an ion exchange resin is discussed and exemplified by Ziolo in U.S. Pat. No. 4,474,866. According to the method employed, an ion exchange resin is loaded with a magnetic ion. The resin is then recovered and dried. The magnetic polymer resin is then micronized to form a fine magnetic powder. The dry magnetic particles formed according to Ziolo, U.S. Pat. No. 4,474,866, like other typical prior art materials, could not be directly suspended in an aqueous medium to form a stable colloid.

Difficulties have been encountered in forming and maintaining nanoscale materials due to the tendency of the particles to aggregate to reduce the energy associated with the high area to volume ratio. This aggregation leads to additional difficulties in the preparation of homogeneous dispersions and thin continuous films produced therefrom.

Prior art formation of films of submicron particles have required the spreading of fine particles which resulted in uneven and noncontinuous films. In addition, if the particles were dispersed in a fluid medium, upon evaporation of the fluid medium, film properties were not continous but were individual islands of particulate material. By contrast, the fluids of the present material are a composite of a crushed matrix material and nanometer particles in an aqueous vehicle. Upon evaporation of the aqueous vehicle in the present invention, the particles are left in a continuous film joined by a network of this crushed resin material.

SUMMARY OF THE INVENTION

It is therefore an object of the present invention to overcome these and other difficulties encountered in the prior art.

It is also an object of the present invention to provide a method of forming submicron particles without the use of extended grinding or milling times.

A further object of the present invention is to provide a method of forming an aqueous suspension or colloid of submicron particles.

Another object of the present invention is to provide an aqueous colloid of fine particles capable of forming continuous films of submicron particles.

Another object of the present invention is to proved small or nanoscale particles in a medium or matrix that can be easily crushed or micronized to form a dry powder for dispersion in a fluid or solid, for example a polymer.

These and other objects have been achieved by the present invention which relates to a process for preparing a stable colloid of fine particles which comprises 1) preparing an ion exchange crosslinked resin matrix; 2) loading the resin matrix with an ion; 3) treating the loaded resin matrix to cause an in-situ precipitation of fine particles; 4) repeating the ion exchange process until the matrix ruptures; and 5) optionally, micronizing the mixture of resin and precipitated particles in a fluid to form the stable colloid of submicron particles where an ion exchange resin of larger than submicron dimensions is used or alternatively, where smaller submicron particles are desired. For the purposes of the present invention, colloid is defined as a stable homogeneous dispersion of particles in a fluid medium.

When using a submicron resin, no micronization step is required to form the stable colloid. A micronization step may however, be used with a submicron resin if smaller submicron particles are desired.

When a micronization step is necessary, the present invention drastically reduces the grinding or milling time to a range of approximately 30 to about 180 minutes. According to the present invention, submicron particles may be produced by building from the molecular level rather than grinding larger particles down to form smaller particles.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

DESCRIPTION OF THE PREFERRED EMBODIMENTS

Figure 1:
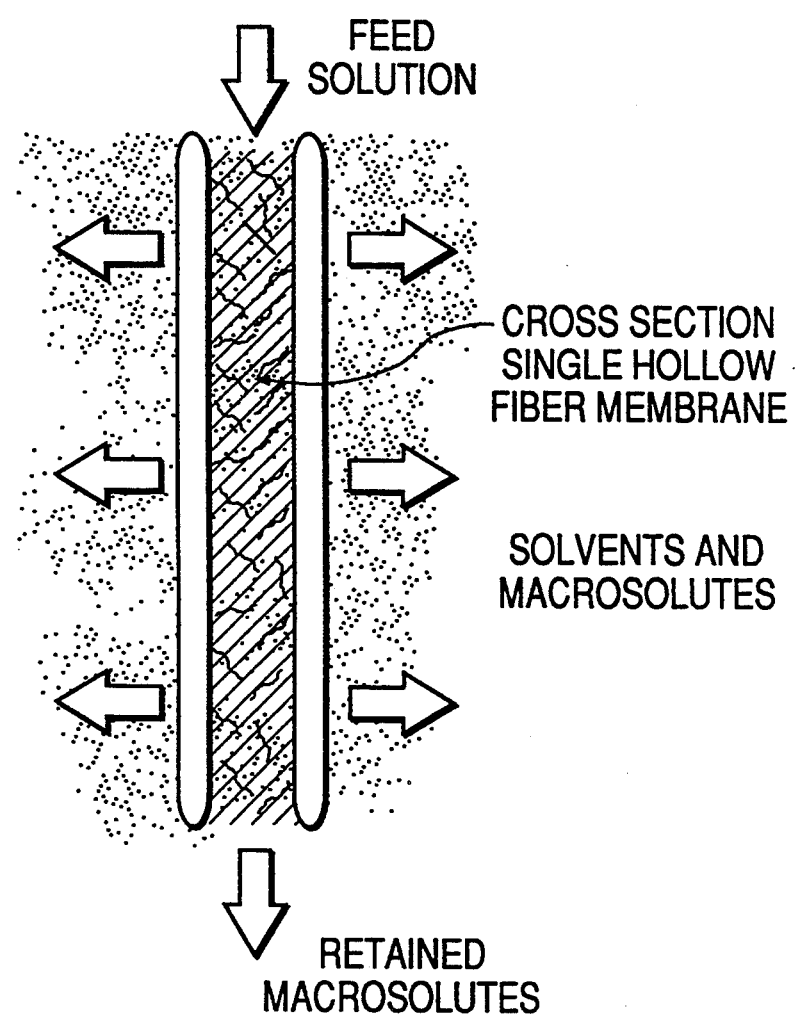
FIG. 1 is an illustration of hollow fiber ultrafiltration.

According to the invention, a crosslinked polymer resin matrix having chemically addressable sites is used to prepare the colloid. Such a matrix is provided by an ion exchange resin. The majority of organic ion exchange resins are based upon a matrix of crosslinked polystyrene which provides a chemically and physically robust micro structure of the type needed to produce the fine particulate. A preferred resin is a polystyrene sulfonic acid (PSSA) ion exchange resin crosslinked from about 1 to 16% with divinylbenzene. More preferably, a 4 to 8% divinylbenzene crosslinked sulfonated polystyrene.

Illustrative examples of suitable ion exchange resins include those polymers possessing chemically addressable sites dispersed throughout their matrix, or on their surface, which sites can be used to generate an ionic component in situ.

Specific examples of these resins include sulfonated polystyrenes, $R-CH_2SO_3-H^+$ strongly acidic phenolics, weakly acidic acrylics, $R-COO-Na^+$ wherein R is an alkyl group, weakly acidic chelating polystyrenes and the like, with strongly acidic sulfonated polystyrenes being preferred. In addition, anionic exchange resins such as Baker IONAC NA-38, Baker IONAC A-554, Dowex® SBR, Amberlite® IRA-400 and Dowex® IX8-100 may also be used. Other suitable resins can be selected by one having ordinary skill in the art provided that they are colorless or have only slight color density, have a non-interfering color, and providing they achieve the objectives of the present invention.

The resin matrix is preferably capable of withstanding repeated cycles of drying, swelling, and de-swelling and preferably will not decompose thermally below 120° C. The resin is preferably unaffected by exposure to strong acids, bases or redox solutions.

The resin may be of an analytical or an industrial grade. Aside from differences in cost and size, the industrial grade resins have more color than the analytical grades. Most of the color associated with industrial grade resins is temporary and is easily removed by solvent washing, usually with water. After washing, the industrial grade resin retains a weak amber color similar to the analytical grade.

Resin beads may be about 20 to about 500 mesh and are preferably from about 20 to about 400 mesh size or between about 850 and about 38 microns. More preferably, the resin beads are from about 200 to about 400 mesh or between about 75 and 38 microns. The larger size beads have two advantages over the smaller beads. First, the processing time is shorter when using the larger beads due to faster settling rates and ease of decanting. Second, the larger beads are mechanically weaker than the smaller bead due to greater osmotic shock effects during their manufacture. Thus, low optical density material prepared from the larger beads crushes and presumably micronizes more easily than those made from the smaller beads. Despite its weaker mechanical strength, the lower cost larger resin retains its ion-exchange capability through and even beyond ten-cycles of loading.

Commercial ion exchange resins for use in the invention include polystyrene sulfonic acid ion exchange resins which may be obtained from such manufacturers as Rohm and Haas and Dow Chemical.

In addition to cost and color, homogeneity of the resin with respect to cross-link density and site sulfonation should be considered in selecting an appropriate resin. These aspects affect the dispersion characteristics of particle size, shape and distribution which in turn alter the optical characteristics of the composite.

Alternatively, the resin may be selected in a submicron size so that no additional micronization step is necessary. Examples of such a matrix include a submicron sulfonated polystyrene resin, designated SSPR for the purposes of the present invention, which is available from Rohm & Haas in emulsion form. Additional submicron resins which would be appropriate for use in the present invention include any submicron resins which do not interfere with the characteristics of the material disclosed herein.

Once a resin is selected, the resin matrix is next loaded with the precipitate precursor ion. In the case of the magnetic colloid this may be several different ions including ferrous or ferric ions in a manner described in U.S. Pat. No. 4,474,886 to Ziolo. In the case of a nonmagnetic colloid, this may include ions of, for example, sulfur, selenium, gold, barium, cadmium, copper, silver, manganese, molybdenum, zirconium, gallium, arsenic, indium, tin, lead, germanium, dysprosium, uranium, aluminum, platinum, palladium, iridium, rhodium, cobalt, iron, nickel, rhenium, tungsten, lanthanum and the like.

Next, the loaded resin is treated so as to cause an in-situ precipitation of the material desired for dispersion. Cadmium sulfide a well known semiconductor material, for example, may be precipitated in this manner. The nanometer particles may be precipitated as compounds, for example as copper sulfide or in their elemental forms.

Once the composite material has been formed, the ion exchange process and subsequent formation of particles may then be repeated several times to achieve higher loading of particles. As the number of particles increases or their size increases the crosslinked polymer matrix becomes stressed and eventually ruptures. In a typical ion exchange resin, stress may occur after the first loading.

Micronization, by for example, ball-milling of this composite in a stable medium or vehicle will lead to the formation of the stable dispersion of the composite material in about 30 to about 180 minutes. A suitable vehicle is any vehicle which allows dispersion including for example water and water miscible materials and like solvents, such as methanol and the like. The vehicle may further include any material which will not adversely effect the desired mechanical, electrical or optical properties, for example, water soluble polymers.

Fluidization as used herein is defined as the formation of a liquid through micronization of the polymeric matrix containing the particles. Micronization may be accomplished by attrition, air attrition followed by dispersion in water, shaking, milling, ball milling, shaking or ball milling directly in water or the like. Shaking or ball milling are preferred. Coarse particles may be removed by filtration or centrifugation. The average micronization time is from about 30 to about 180 minutes.

With the use of a submicron resin a stable colloid will be formed upon precipitation and no further micronization step will be necessary. An additional micronization step may be carried out if a smaller particle size colloid is desired.

In the case of submicron resins, the ultrafiltration technique is used in place of conventional ion exchange techniques to process the resin because of the very small size of the resin beads. The submicron resin beads may be suspended in an aqueous colloidal form prior to incorporation of the ions, thus resulting in a stable colloidal dispersion of the resin and particles. Alternatively, the resin beads may be removed and dried to form a dry nanocomposite.

Figure 2:
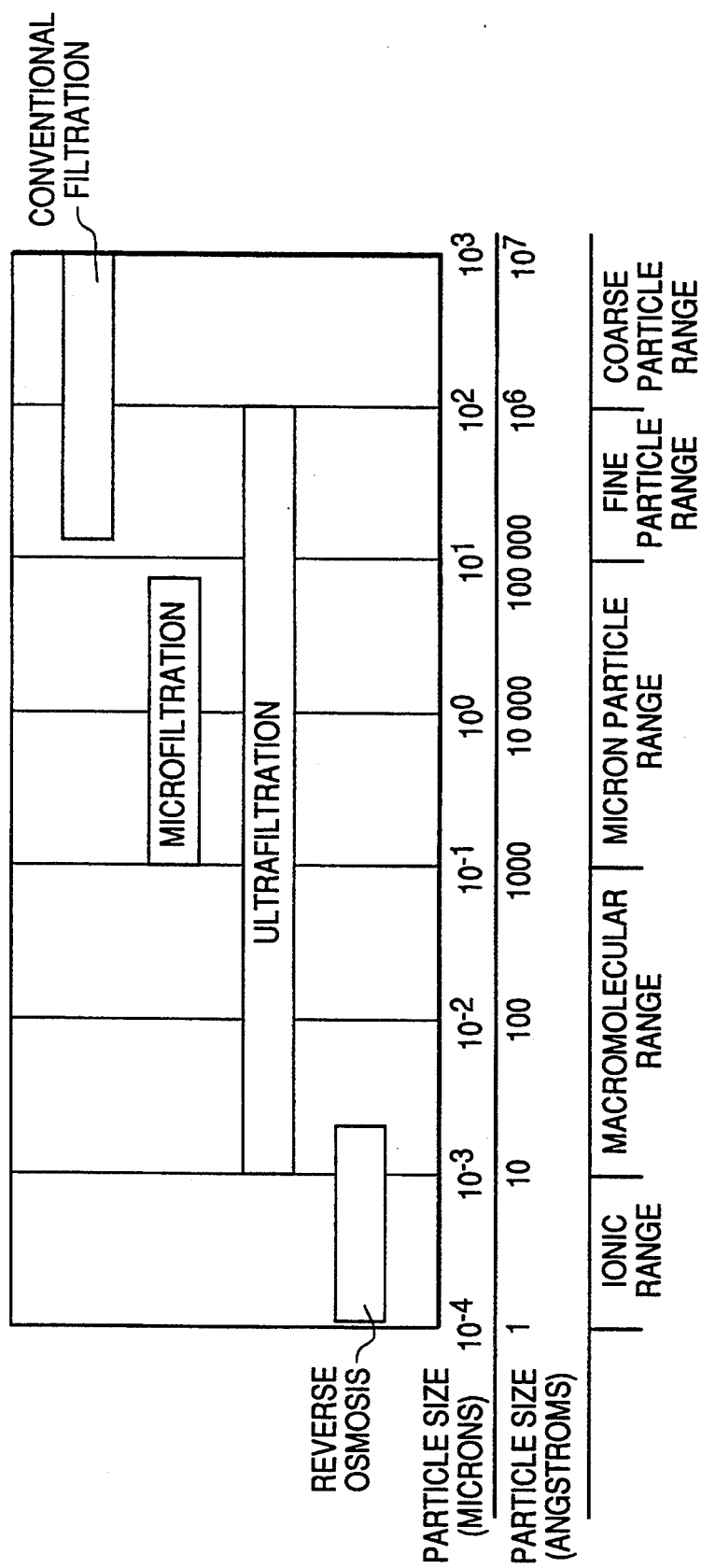
FIG. 2 illustrates membrane separation application based on particle size.

Ultrafiltration is a pressure-activated membrane filtration process capable of performing a variety of selective molecular separations. For a discussion of this technology see Breslau, B. R., "Ultrafiltration, Theory and Practice," paper presented at the 1982 Corn Refiners Association Scientific Conference, Lincolnshire, Ill., Jun. 16–18, 1982, which is incorporated herein by reference. In ultrafiltration, the process fluid flows across a membrane with pore diameters in the range of 10 to 200 Angstroms, as shown in FIG. 1. Solvents and species whose molecular size and weight are below the molecular weight cut-off will permeate through the membrane and emerge as an ultrafiltrate, while rejected species are progressively concentrated in the process stream. Ultrafiltration differs from reverse osmosis in that it employs a more "porous" membrane which will not retain low molecular weight species such as solvent molecules. FIG. 2 illustrates the membrane separation application based on particle size. Ultrafiltration covers the range of $10^{-3}$ to $10^2$ microns.

At the heart of the ROMICON® ultrafiltration system is the hollow fiber 3. These hollow fibers are constructed on non-cellulosic, synthetic polymers. They are anisotropic and have a very tight skin on the internal surface supported by a sponge-like outer structure. The extremely thick wall of the hollow fiber gives it the strength needed for long service. The skin or active membrane is 0.1 microns thick and any species passing through the skin readily passes through the outer structure. Any buildup of foreign matter which occurs, therefore, is solely on the skin and not in the sponge-like outer support.

The self-supporting structure of the hollow fiber enables the use of a backflushing technique to maintain continuous high average flux rates through the fibers. Backflushing forces foreign materials and flux-inhibiting layers from the membrane surface. Because flow occurs on the inside of the hollow fiber under controlled fluid management conditions, high shear forces exist at the membrane surface that minimize concentration polarization by rejected solutes. The rejected solutes are continuously concentrated upstream in the process, while low molecular weight solutes and solvent permeate through the membrane.

The ROMICON® hollow fibers are housed in a cartridge (shell and tube geometry) 4. Shell and tube geometry refers to a construction whereby the fibers are held within an external cartridge, making possible flow through the fibers or flow around the fibers by feeding fluid into the external cartridge, as explained below. Each cartridge contains two process and two permeate ports. The process ports feed directly to the lumen of the fibers, while the permeate ports feed directly to the cartridge shell. Flow through these ports can be completely controlled and switched from one mode of operation to another. The cartridge can be operated at high temperatures due to the non-cellulosic nature of the ROMICON® hollow fiber and in the wide pH range encountered in the preparation of these nanometer particles.

The composite resin beads as described above may be dried prior to micronization and then subsequently micronized to produce a dry powder composite for dispersion in a fluid or solid, for example, a polymer. This dispersion of crushed composite and fluid or solid may subsequently be used in film formation as described below.

The materials described herein may be dyed or may coexist with the colloidal suspension of a second constituent which may be colored pigment. Colored pigment may be added to the mix along with the composite to achieve the desired color. In addition, since ion exchange capability is maintained in the composite itself, color may also be introduced directly in the polymer matrix by ion exchanging dyes or other chromophores into the resin.

There can be selected as pigments, known magenta, cyan, yellow pigments and mixtures thereof, as well as red, green, or blue pigments, or mixtures thereof, and the like.

Illustrative examples of magenta materials that may be used as pigments, include for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4(octadecyl-sulfonomido) phthalocyanine, X-copper phthalocyanine pigment listed in the Color Index as CI 74160, CI Pigment Blue, and Anthradanthrene Blue X2137, and the like. Illustrative examples of yellow pigments that may be employed include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron yellow SE/GLN, CI dispersed yellow 33, 2,5-dimethoxy-4-sulfonanilide phenylazo-4'-chloro-2,5-dimethoxy aceto-acetanilide, permanent yellow FGL, and the like.

Illustrative examples of red materials useful as pigments include, cadmium red 150K, CI pigment red 108; lithol red, CI pigment red 49; lithol scarlet, CI pigment red 4301L; toluidene red, CI pigment red 3; and the like. Examples of green pigments include, chrome green, CI pigment green 15; chrome green lake, CI pigment green 18; chrome intra green, CI pigment green 21; phthalocyanine green, CI pigment green 7; and the like. Examples of blue pigments include, phthalocyanine blue, CI pigment blue 15; Prussian blue, CI pigment blue 27; ultramarine blue, CI pigment blue 29, and the like.

The color pigments, namely, red, green, blue, cyan, magenta and yellow pigments are generally present in an amount of from about 1 to about 20% and preferably from about 2 to about 10%. The pigment is introduced through attrition, air attrition, shaking, milling, ball milling or the like. The pigment particle size is selected so that it will not interfere with any of the desired material characteristics. The particles are preferably submicron in size but may be larger depending upon the intended color application. The ability to manipulate the size of the pigment particle to achieve the desired color result would be with the skill of the practitioner in the art.

Examples of suitable water soluble dyes include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P- BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, INtracron Turquoise HA, and Intracron Black RL, available from Crompton and Knowles, Dyes and Chemicals Division, and the like. Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

The dye is present in the composition in any effective amount, typically from about 1 to about 20% by weight, and preferably from about 2 to about 10% by weight, although the amount can be outside of this range. As will be recognized by the skilled artisan, the above listing of dyes and pigments are not intended to be limiting. Additional dyes and pigments for use in the present invention are readily recognizable by the skilled artisan.

Figure 3:
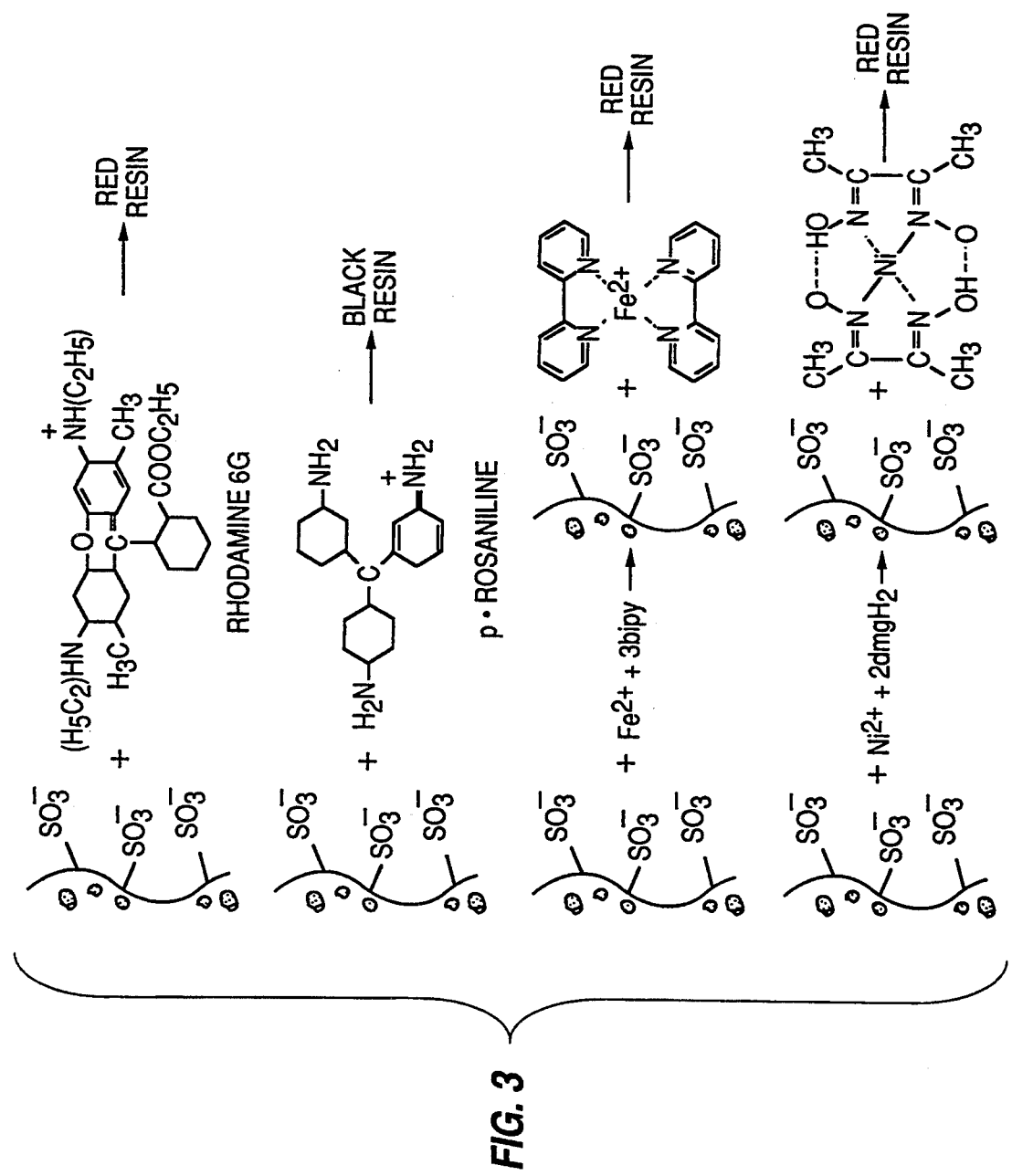
FIG. 3 illustrates direct coloring of the resin matrix.

Since ion exchange capability is maintained in the composite itself, color may also be introduced directly in the polymer matrix by ion exchanging dyes or other chromophores in the resin. Two examples of this approach are illustrated in FIG. 3. The first two direct coloring examples shown in FIG. 3 illustrate ion exchange of cationic dyes to produce red and black resins respectively.

In addition, again using the ion exchange capabilities of the resin, direct coloration can be achieved by the introduction of a metal that can form chromophores with known chelating agents and other chromophore producing materials. The second two direct coloring examples of FIG. 3 illustrate this method of direct precipitation of chromophores in the resin using iron(II) bipyridyl and nickel dimethylglyoxime to form red resins. Direct coloration has been found to be highly efficient and rapid using the micronized form of the composite. Any known dye may be used which is capable of ionic exchange with the resin, as described above. Methods of direct coloration are described in F. Helfferich, "Ion Exchange", McGraw-Hill, N.Y. 1962, and R. Paterson, "An introduction to Ion Exchange", Heyden and Son, Ltd., London, 1970, both of which are incorporated herein by reference.

Colored materials prepared as described above are stable toward settling and do not separate color from the vehicle.

The materials as described herein may be used in the formation of continuous films, surface coatings, thick films and free-standing films. Such films may be formed on any known substrate, for example glass, metal, selenium, silicon, quartz, fabric, fibers, paper and the like. Methods of forming these films preferably include evaporation, spin coating, dip coating, extrusion coating, gravure coating, roll coating, cast coating, brush coating, calender coating, meniscus coating, powdered resin coating, spray coating, electrostatic spray coating and by draw bar. Any known method of coating is acceptable. Examples of various coating methods may be found, for example in G. L. Booth, "Coating Equipment and Processes" Lockwood Publishing, New York, 1970; the Kirk-Othmer Encyclopedia of Chemical Technology, 3rd. ed., Wiley-Interscience, New York, 1979; and in "Ullmann's Encyclopedia of Industrial Chemistry," VCH Publishers, New York, 1991. Furthermore, the material of the invention may be mixed or otherwise added to known film forming materials such as polymers, plastics and the like to cast or produce films containing the material of the invention. Films formed from the material of the invention include for example mechanical, magnetic, optical or electronic device applications.

The following examples are illustrative of the invention embodied herein.

EXAMPLE I 60 g of Dowex® 50X8-400 ion exchange resin, obtained from the Aldrich Chemical Co. (Milwaukee, Wis.), were washed clean in batch with concentrated HCl, followed by washings with 0.1N NaOH, deionized water, methanol and finally deionized water.

38 g of $BaCl_2$ in 350 ml of $H_2O$ was then added to the washed resin and the mixture stirred for 2 hours. The mixture was filtered and the procedure repeated with another batch of $BaCl_2$ solution. The mixture was then filtered and the resin washed with deionized water, first through a filter and then in batch until the filtrate tested negative for barium ions using a sulfate test for barium. The resin was then filtered and a solution of 60 g of $Na_2SO_4$ in 400 mls of $H_2O$ was added. The mixture was stirred for 1.5 hours. The resin was filtered and washed clean with large amounts of deionized water then dried overnight at 110° C. to form a composite of ultra-fine particles of $BaSO_4$ in the ion exchange resin. Transmission electron microscopy revealed barium sulfate particulate about 5 to 15 nm in size suspended in the resin. Elemental analysis for barium showed the expected barium to sulfur (sulfonate) ratio of one half.

EXAMPLE II

An ultra-fine particle dispersion of copper sulfide in a polymer resin matrix was formed by treating Dowex® 50X8-400 ion exchange resin from the Dow Chemical Co. (Midland, Mich.) with solutions of copper nitrate and soluble sulfide.

60 g of Dowex® 50X8-400 was washed as described in Example I, above and placed in a 500 ml beaker equipped with magnetic stirrer and stirring bar. Next, 350 ml of water containing 90 g of $Cu(NO_3)_2.6H_2O$ was added to the beaker and the contents stirred for one hour. The resin was then filtered and the procedure repeated a second time. The resin was then thoroughly washed with deionized water until no free copper ions were found in solution. The resin was filtered using a coarse glass frit funnel and resuspended in a solution containing 85 g of $Na_2S.9H_2O$ in about 400 ml of water and stirred for about one hour at room temperature. The resulting dark colored resin was then filtered and again washed with large amounts of deionized water until it was free of excess soluble sulfide. Electron microscopy of the microtomed resin revealed CuS particles less than 20 nm dispersed throughout the resin. Elemental analysis for copper showed the expected copper sulfide to sulfonate sulfur ratio of about one half.

EXAMPLE III

A nanocomposite of the well-known semiconductor, cadmium sulfide, CdS, was prepared by following the procedure of Example II, except that 80 g of $Cd(NO_3)_2$ were used in place of the copper nitrate. The cadmium sulfide was then precipitated in the ion exchange resin and processed as described in Example II. In a separate experiment, the CdS was precipitated using a solution of 25 g of ammonium sulfide, $(NH_4)_2S$, in 300 g of water. The yellow/orange composite was then filtered and thoroughly rinsed with deionized water to remove soluble sulfide. The resin was then dried at 110° C. overnight. The cadmium sulfide particles in the resin ranged in size from about 0.1 to greater than 20 nm depending on processing conditions.

EXAMPLE IV 60 g of Amberlite® IRP-69 ion exchange resin manufactured by Rohm and Haas Co. (Philadelphia, Pa.) was washed as described in Example I and placed in a 500 ml beaker equipped with magnetic stirrer and stirring bar. The resin was then treated with a solution containing 40 g of manganese chloride in 350 ml of water and stirred for 2 hours. The resin was filtered, and the procedure repeated a second time. The resin was then filtered and rinsed thoroughly with large amounts of deionized water. The resin was then suspended in 300 ml of deionized water in a 500 ml beaker. 6 g of NaOH in 25 ml of deionized water was added to the beaker with stirring to bring the pH to near 14. The suspension was then treated with 10 ml of 30% $H_2O_2$ diluted to 60 ml with deionized water in a dropwise fashion over a period of 30 minutes with continued stirring. The resin was then washed to neutral pH, filtered and dried overnight at 110° C. to afford a composite of ultra-fine particle $MnO_2$ in polymer. The $MnO_2$ particle sizes in the resin ranged from about 0.2 to 20 nm as determined by transmission electron microscopy of microtomed samples of the composite.

EXAMPLE V 60 g of washed Dowex® 50X8-400 ion exchange resin were stirred for one hour in a solution containing 60 g of silver nitrate in 400 ml of deionized water. The resin was then filtered and treated a second time with the silver nitrate solution. The resin was then washed with large amounts of deionized water to remove all traces of free silver ion. Next, the resin was stirred in a sodium chloride solution of 50 g of NaCl in 400 ml of deionized water for one hour. The resin was then filtered and dried overnight in a vacuum desiccator to form a nanocomposite of silver chloride in polymer resin. Transmission electron microscopy and X-ray diffraction indicated silver chloride in a particle size less than 20 nm.

Other embodiments of the invention will be apparent to those skilled in the art from consideration of the specification and practice of the invention disclosed herein. It is intended that the specification and examples be considered as exemplary only with a true scope and spirit of the invention being indicated by the following claims.

We claim:

1. A method of forming a colloidal dispersion of fine particles comprising:
   providing a submicron ion exchange resin which remains suspended in a fluid medium;
   loading said resin with an ion;
   treating the resin to cause in-situ formation of submicron particles and form a stable colloid; and
   micronizing the resin and particles in said colloid.

2. The method according to claim 1, wherein said resin matrix and fine particles are micronized by ball milling.

3. The method according to claim 1, wherein said resin matrix and fine particles are micronized by shaking.

4. The method according to claim 1, wherein the loading step is repeated a plurality of times.

5. The method according to claim 4, wherein said loading step is repeated between about 5 and about 10 times.

6. The method according to claim 1, wherein said ion is selected from the group consisting of sulfur, selenium, gold, barium, cadmium, copper, silver, manganese, molybdenum, zirconium, gallium, arsenic, indium, tin, lead, germanium, dysprosium, uranium, aluminum, platinum, palladium, iridium, rhodium, cobalt, iron, nickel, rhenium, tungsten and lanthanum.

7. The method according to claim 1, wherein said loading step is repeated until the resin matrix ruptures.

8. The method according to claim 1, wherein said ion is cadmium and said fine particles are cadmium sulfide.

9. The method according to claim 1, wherein said ion is barium and said fine particles are barium sulfate.

10. The method according to claim 1, wherein said ion is copper and said fine particles are copper sulfide.

11. The method according to claim 1, wherein said ion is manganese and said fine particles are manganese oxide.

12. The method according to claim 1, wherein said ion is silver and said fine particles are silver chloride.

13. The method according to claim 1, wherein said ion is silver and said fine particles are elemental silver.

14. The method according to claim 1, wherein said ion is gold and said fine particles are gold.

15. The method according to claim 1, wherein said ion is selenium and said fine particles are selenium.

16. The method according to claim 1, wherein the fluid medium is an aqueous medium.

* * * * *